(No Model.)
E. L. KELLY.
CAR FENDER.
No. 540,101. Patented May 28, 1895.
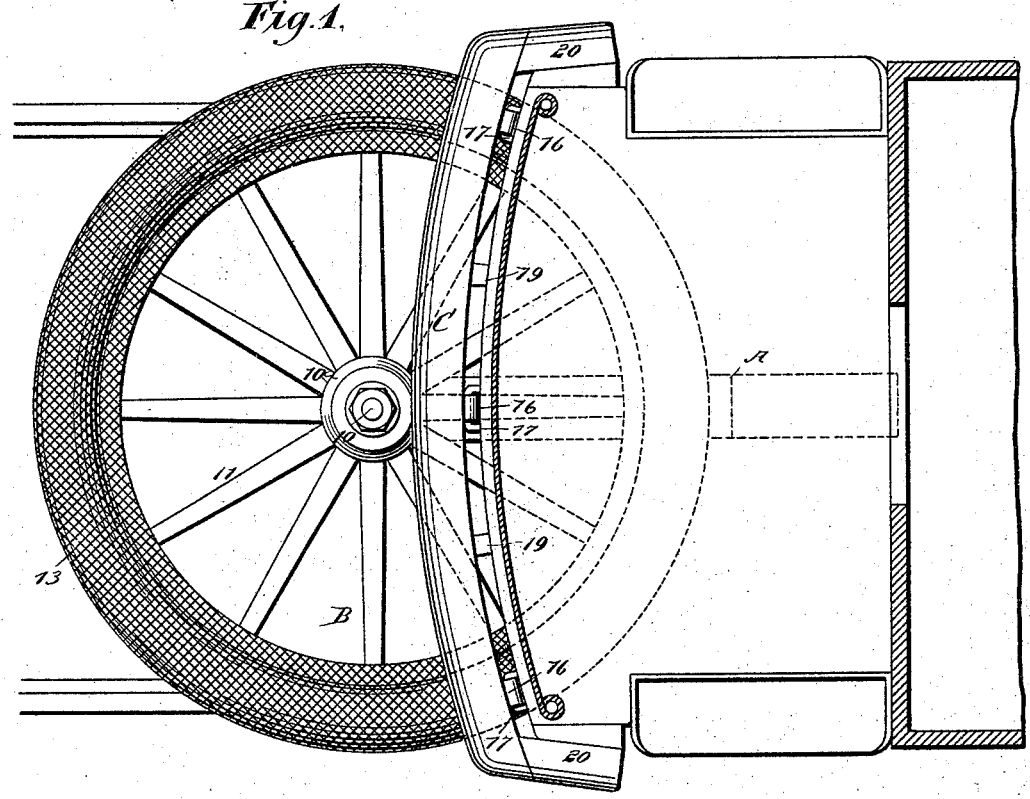
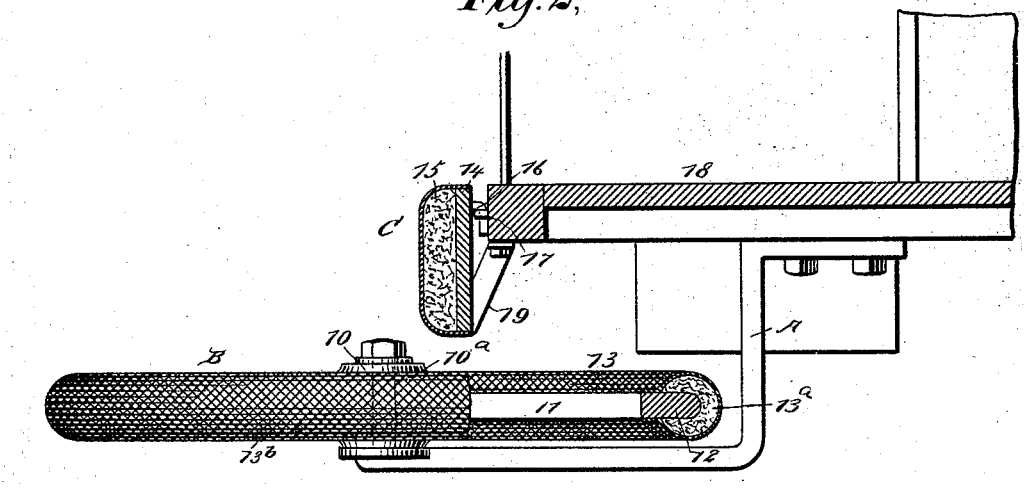
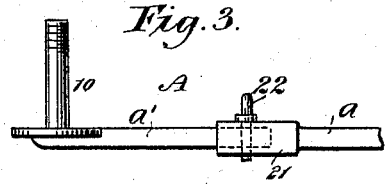
WITNESSES:
Edward Thorpe
Fred Acker
INVENTOR
E. L. Kelly
BY
Munn & Co
ATTORNEYS.

UNITED STATES PATENT OFFICE.

EDWARD L. KELLY, OF PHILADELPHIA, PENNSYLVANIA.

CAR-FENDER.

SPECIFICATION forming part of Letters Patent No. 540,101, dated May 28, 1895.

Application filed March 21, 1895. Serial No. 542,679. (No model.)

*To all whom it may concern:*

Be it known that I, EDWARD L. KELLY, of Philadelphia, in the county of Philadelphia and State of Pennsylvania, have invented a new and Improved Car-Fender, of which the following is a full, clear, and exact description.

My invention relates to an improvement in car fenders, and it has for its object to provide a car fender which will be exceedingly simple, durable and effective in action and which may be manufactured and supplied at a minimum of cost.

Another object of the invention is to provide a fender in the nature of a wheel, whereby a person or object coming in contact with the fender will be carried to one or the other side of the track, and furthermore to provide for an effective gripping surface at the periphery of the wheel, thereby enabling a person in falling to grasp and hold the wheel fender, supporting himself thereon in a great measure while the fender is operating to carry him out of the path of the car.

A further object of this invention is to provide a fender which may be expeditiously and conveniently transferred from one end of the car to the other, and which may be used in connection with a removable buffer, adapted to offer a cushioned surface at the front of the platform and dashboard of a car, the buffer being carried a sufficient distance outward beyond the sides of the car to form a guard for the steps.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the fender applied to a car, the dashboard of the car and a portion of the body being in horizontal section. Fig. 2 is a partial side elevation and partial sectional view of the fender-wheel and a vertical section through the platform of the car and the buffer, and Fig. 3 is a detail view of the preferred form of fender-bracket.

In carrying out the invention a bracket A is secured beneath the platform of the car. This bracket is preferably of an angular or L-construction, and its horizontal member extends forwardly and beyond the outer edge of the platform, and is provided at its outer extremity with a vertical spindle 10. This bracket is attached at the central portion of the platform.

The fender proper consists of a wheel B, and this wheel comprises a hub $10^a$ mounted to turn on the said spindle 10, rigid spokes 11 and a rigid felly 12 connecting the spokes, the wheel being horizontally located; and the said wheel is of sufficient diameter to extend entirely across the track, and in a measure as far outward at each side of the car, if not farther, than the steps.

The wheel fender is so placed that a greater portion of it appears outside of the platform than beneath it. The felly of this wheel has formed thereon in any approved manner a cushion 13, which completely covers and conceals the felly and may extend a predetermined distance over the spokes. This cushion is preferably made as shown in the drawings, in which the felly has applied thereto an upholstering material $13^a$ which is incased by a covering $13^b$ of canvas or other material adapted for the purpose, presenting a rough outer face, the object of this rough outer face being to afford a person a firm grip on the wheel should he come in contact therewith.

It is obvious that under the construction above set forth, any object that may come in contact with the wheel will be carried to either one or the other side of the track, and the cushion 13 will preserve a person struck by it against serious injury, and if a person is able to grasp the wheel he may retain a firm hold thereon until the wheel has traveled in a direction to deliver him at the side of the car.

In order that a person falling on the wheel shall not be injured by engagement with the front edge of the platform the said edge is protected by a buffer C, and this buffer consists preferably of a back plate 14 of any desired material, having a cushioned or upholstered front face 15, and the buffer is provided with hooks 16 adapted to enter eyes 17 located upon the front of the platform; but any other fastening device may be employed which will enable the buffer to be readily removed from the platform. The buffer extends downward to a predetermined distance from the wheel, yet it is perfectly clear thereof. If in practice it is found desirable braces 19 may be attached to the bottom of the platform at the front to engage with the back of the buffer.

The buffer is preferably made to conform to the shape of the forward end of the platform, and extends beyond the sides thereof, the platform at each side in front of the steps being provided with cushioned blocks or offsets 20, shown best in Fig. 1, against which the back of the buffer at its ends has even bearing; and the side cushions, which are fixtures on the car, virtually form side continuations of the buffer.

The wheel is held in place, yet permitted to revolve, by means of suitable washers and lock nuts.

It is evident that this fender is economic, simple and durable as well as effective, and that it may be expeditiously and conveniently transferred from one end of a car to the other.

In practice I prefer to make the bracket A, in parts $a$ and $a'$, as shown in Fig. 3. The body $a$ which is secured to the car is made to terminate at its forward end in a socket 21, and the outer section $a'$ is provided with the upright spindle 10, upon which the fender wheel is mounted and the wheel carrying section of the bracket is placed in the socket 21 and held in position by a pin 22 or its equivalent. Under this construction the outer section of the bracket is removed with the wheel.

Having thus described my invention, I claim as new and desire to secure by Letters Patent—

1. A fender for cars, the same consisting of a support adapted for attachment to a car, a wheel of rigid structure adapted to rotate horizontally on the said support, and a peripheral cushion on the wheel having a covering of rough textile material the wheel being of sufficient diameter to extend beyond the wheels of the car and being so located as to extend a predetermined distance beyond the front of the car platform, substantially as set forth.

2. A car fender, the same consisting of a support adapted for attachment to the platform of a car, the said support being adapted to extend beyond the outer edge of the platform, and a wheel mounted to revolve horizontally on said support, the said wheel being of rigid structure and provided with a cushioned peripheral surface having a roughened outer face, as and for the purpose specified.

3. The combination, with a car, and a sectional separable bracket secured to the platform thereof and extending outward beyond the platform, of a wheel mounted to revolve horizontally on the said bracket, the wheel being of a diameter sufficient to extend over the rails of the track, the said wheel being of rigid structure and provided with a cushioned periphery, the cushion having a roughened outer surface, as and for the purpose specified.

4. The combination, with a car platform and a sectional separable bracket secured thereto extending beyond the front edge of the said platform, of a rigidly constructed wheel mounted to revolve upon the outer end of the bracket, having a roughly upholstered peripheral surface, and a cushioned buffer removably attached above the wheel fender to the platform of the car, as and for the purpose specified.

5. The combination, with a car platform and a bracket secured thereto extending outward beyond the front edge of the said platform, of a rigidly constructed wheel mounted to revolve upon the outer end of the bracket and having a roughly upholstered peripheral surface, a cushioned buffer removably suspended from the front of the platform over the wheel fender, extending outward beyond the sides of the car platform, and stationary buffers located at the sides of the platform, constituting continuations of the front buffer, as and for the purpose set forth.

6. The combination, with a car platform, of a cushion buffer removably secured to the front of the platform, and correspondingly constructed buffers permanently secured to the sides of the platform, meeting the front buffer and constituting return extensions thereof, whereby the fixed buffers protect persons from injury from the steps when approaching the car from the front, as and for the purpose specified.

EDWARD L. KELLY.

Witnesses:
JOHN A. KELLY,
FRANCIS J. FALLS.